(12) United States Patent
Barrett et al.

(10) Patent No.: US 9,288,218 B2
(45) Date of Patent: *Mar. 15, 2016

(54) SECURING AN ACCESSIBLE COMPUTER SYSTEM

(75) Inventors: Joseph G. Barrett, Oak Hill, VA (US);
Christopher J. Wright, Leesburg, VA (US); Victor R. Blake, Lincoln, VA (US); Thomas Stehnach, Fairfax, VA (US); Rajkumar Jalan, Saratoga, CA (US)

(73) Assignees: Foundry Networks, LLC, Alviso, CA (US); AOL INC., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,499

(22) Filed: Mar. 19, 2010

(65) Prior Publication Data

US 2010/0235506 A1 Sep. 16, 2010

Related U.S. Application Data

(63) Continuation of application No. 09/666,140, filed on Sep. 20, 2000, now Pat. No. 7,711,790.

(60) Provisional application No. 60/227,309, filed on Aug. 24, 2000.

(51) Int. Cl.
*G06F 15/173* (2006.01)
*H04L 29/06* (2006.01)
(Continued)

(52) U.S. Cl.
CPC .......... *H04L 63/1408* (2013.01); *H04L 47/822* (2013.01); *H04L 63/1458* (2013.01); *H04L 45/50* (2013.01)

(58) Field of Classification Search
CPC .............. H04L 29/06; H04L 29/08072; H04L 29/0809; H04L 29/08144
USPC .......................... 709/225, 226, 227, 228, 229
See application file for complete search history.

(56) References Cited

U.S. PATENT DOCUMENTS

| 1,301,899 A | 4/1919 | Mayo |
| 4,467,147 A | 8/1984 | Rubin |

(Continued)

FOREIGN PATENT DOCUMENTS

| EP | 720333 A2 | 7/1996 |
| EP | 889668 A3 | 9/2002 |

(Continued)

OTHER PUBLICATIONS

Eric Allman, Sendmailtm™ Installation and Operation Guide Version 8.310 for Sendmail Version 8.10, Sendmail, Inc., (84 pages).

(Continued)

*Primary Examiner* — Philip Chea
*Assistant Examiner* — Van Kim T Nguyen
(74) *Attorney, Agent, or Firm* — Fish & Richardson P.C.

(57) ABSTRACT

To secure an accessible computer system, the computer system is monitored for connection transactions. An access requestor is denied access to the computer system when the access requestor initiates a number of connection transactions that exceed a configurable threshold number during a first configurable period of time. The monitoring may include detecting connection transactions initiated by the access requestor, counting the number of connection transactions initiated by the access requestor during the first configurable period of time, and comparing the number of connection transactions initiated by the access requestor during the first configurable period of time to the configurable threshold number.

18 Claims, 8 Drawing Sheets

(51) Int. Cl.
*H04L 12/911* (2013.01)
*H04L 12/723* (2013.01)

(56) References Cited

U.S. PATENT DOCUMENTS

| | | |
|---|---|---|
| 4,652,990 A | 3/1987 | Pailen |
| 4,821,034 A | 4/1989 | Anderson |
| 5,444,705 A | 8/1995 | Olnowich et al. |
| 5,475,839 A | 12/1995 | Watson et al. |
| 5,546,390 A | 8/1996 | Stone |
| 5,548,533 A | 8/1996 | Gao et al. |
| 5,577,197 A | 11/1996 | Beck |
| 5,606,668 A | 2/1997 | Shwed |
| 5,619,648 A | 4/1997 | Canale et al. |
| 5,634,040 A | 5/1997 | Her et al. |
| 5,699,514 A | 12/1997 | Durinovic-Johri et al. |
| 5,704,047 A | 12/1997 | Schneeberger |
| 5,732,212 A | 3/1998 | Perholtz et al. |
| 5,742,587 A | 4/1998 | Zornig et al. |
| 5,774,660 A | 6/1998 | Brendel et al. |
| 5,805,810 A | 9/1998 | Maxwell |
| 5,857,188 A | 1/1999 | Douglas |
| 5,862,325 A | 1/1999 | Reed et al. |
| 5,877,724 A | 3/1999 | Davis |
| 5,884,246 A | 3/1999 | Boucher et al. |
| 5,884,312 A | 3/1999 | Dustan |
| 5,923,848 A | 7/1999 | Goodhand et al. |
| 5,999,932 A | 12/1999 | Paul |
| 6,002,851 A | 12/1999 | Basavaiah et al. |
| 6,018,619 A | 1/2000 | Allard et al. |
| 6,044,260 A | 3/2000 | Eaton et al. |
| 6,049,774 A | 4/2000 | Roy |
| 6,052,709 A | 4/2000 | Paul |
| 6,072,942 A | 6/2000 | Stockwell et al. |
| 6,088,736 A | 7/2000 | Manning et al. |
| 6,092,115 A | 7/2000 | Choudhury et al. |
| 6,105,012 A | 8/2000 | Chang et al. |
| 6,151,601 A | 11/2000 | Papierniak |
| 6,161,130 A | 12/2000 | Horvitz et al. |
| 6,167,029 A | 12/2000 | Ramakrishnan |
| 6,167,434 A | 12/2000 | Pang |
| 6,182,226 B1 | 1/2001 | Reid et al. |
| 6,195,680 B1 | 2/2001 | Goldszmidt et al. |
| 6,205,551 B1 | 3/2001 | Grosse |
| 6,212,184 B1 | 4/2001 | Venkatachary et al. |
| 6,219,694 B1 | 4/2001 | Lazaridis et al. |
| 6,219,706 B1 | 4/2001 | Fan et al. |
| 6,219,786 B1 | 4/2001 | Cunningham et al. |
| 6,237,027 B1 | 5/2001 | Namekawa |
| 6,266,664 B1 | 7/2001 | Russell-Falla et al. |
| 6,286,049 B1 | 9/2001 | Rajakarunanayake et al. |
| 6,314,464 B1 | 11/2001 | Murata et al. |
| 6,321,267 B1 | 11/2001 | Donaldson |
| 6,330,590 B1 | 12/2001 | Cotten |
| 6,351,764 B1 | 2/2002 | Voticky et al. |
| 6,351,794 B1 | 2/2002 | Spilo et al. |
| 6,360,254 B1 | 3/2002 | Linden et al. |
| 6,418,420 B1 | 7/2002 | DiGiorgio et al. |
| 6,421,688 B1 | 7/2002 | Song |
| 6,430,619 B1 | 8/2002 | Sitaraman et al. |
| 6,438,652 B1 | 8/2002 | Jordan et al. |
| 6,484,203 B1 | 11/2002 | Porras et al. |
| 6,496,866 B2 | 12/2002 | Attanasio et al. |
| 6,507,866 B1 | 1/2003 | Barchi |
| 6,529,955 B1 | 3/2003 | Sitaraman et al. |
| 6,530,025 B1 | 3/2003 | Nakagawa |
| 6,535,517 B1 | 3/2003 | Arkko et al. |
| 6,542,583 B1 | 4/2003 | Taylor |
| 6,580,790 B1 | 6/2003 | Henry et al. |
| 6,591,291 B1 | 7/2003 | Gabber et al. |
| 6,591,301 B1 | 7/2003 | Li et al. |
| 6,615,241 B1 | 9/2003 | Miller et al. |
| 6,636,894 B1 | 10/2003 | Short et al. |
| 6,643,685 B1 | 11/2003 | Millard |
| 6,643,686 B1 | 11/2003 | Hall |
| 6,645,241 B1 | 11/2003 | Strecker |
| 6,654,373 B1 | 11/2003 | Maher, III et al. |
| 6,654,787 B1 | 11/2003 | Aronson et al. |
| 6,662,230 B1 | 12/2003 | Eichstaedt et al. |
| 6,678,835 B1 | 1/2004 | Shah et al. |
| 6,691,156 B1 | 2/2004 | Drummond et al. |
| 6,697,806 B1 | 2/2004 | Cook |
| 6,701,522 B1 | 3/2004 | Rubin et al. |
| 6,732,149 B1 | 5/2004 | Kephart |
| 6,738,814 B1 | 5/2004 | Cox et al. |
| 6,742,123 B1 | 5/2004 | Foote |
| 6,742,128 B1 | 5/2004 | Joiner |
| 6,748,422 B2 | 6/2004 | Morin et al. |
| 6,751,668 B1 | 6/2004 | Lin et al. |
| 6,757,836 B1 | 6/2004 | Kumar et al. |
| 6,763,467 B1 | 7/2004 | Radatti et al. |
| 6,772,334 B1 | 8/2004 | Glawitsch |
| 6,778,498 B2 | 8/2004 | McDysan |
| 6,788,692 B1 * | 9/2004 | Boudreau et al. ............. 370/400 |
| 6,789,203 B1 | 9/2004 | Belissent |
| 6,829,635 B1 | 12/2004 | Townshend |
| 6,829,772 B2 | 12/2004 | Foote et al. |
| 6,834,310 B2 | 12/2004 | Munger et al. |
| 6,839,759 B2 | 1/2005 | Larson et al. |
| 6,868,436 B1 | 3/2005 | Fleming |
| 6,868,498 B1 | 3/2005 | Katsikas |
| 6,894,972 B1 * | 5/2005 | Phaal ............................ 370/229 |
| 6,990,481 B1 | 1/2006 | Coile |
| 7,032,023 B1 | 4/2006 | Barrett et al. |
| 7,047,300 B1 * | 5/2006 | Oehrke et al. ................. 709/226 |
| 7,069,313 B2 | 6/2006 | Alam et al. |
| 7,103,599 B2 | 9/2006 | Buford et al. |
| 7,103,846 B1 | 9/2006 | Shafrir et al. |
| 7,114,083 B2 * | 9/2006 | Devine et al. ................. 713/152 |
| 7,200,662 B2 * | 4/2007 | Hasan et al. .................. 709/226 |
| 7,398,317 B2 | 7/2008 | Chen et al. |
| 7,437,457 B1 | 10/2008 | Eisendrath |
| 7,454,499 B2 | 11/2008 | Cantrell et al. |
| 7,464,410 B1 | 12/2008 | Halasz et al. |
| 7,500,263 B2 * | 3/2009 | Venkatachary et al. .......... 726/4 |
| 7,711,790 B1 | 5/2010 | Barrett |
| 7,725,558 B2 | 5/2010 | Dickenson |
| 7,743,415 B2 * | 6/2010 | Poletto et al. .................... 726/23 |
| 2002/0103916 A1 | 8/2002 | Chen et al. |
| 2002/0107953 A1 | 8/2002 | Ontiveros et al. |
| 2002/0108059 A1 | 8/2002 | Canion et al. |
| 2002/0116463 A1 | 8/2002 | Hart |
| 2003/0145232 A1 | 7/2003 | Poletto et al. |
| 2003/0167402 A1 | 9/2003 | Stolfo |
| 2004/0064515 A1 | 4/2004 | Hockey |
| 2004/0083270 A1 | 4/2004 | Heckerman |
| 2004/0093384 A1 | 5/2004 | Shipp |
| 2006/0136590 A1 | 6/2006 | Barrett et al. |

FOREIGN PATENT DOCUMENTS

| | | |
|---|---|---|
| WO | 9903238 A2 | 1/1999 |
| WO | WO9933188 A2 | 7/1999 |
| WO | WO0219661 A3 | 4/2002 |

OTHER PUBLICATIONS

Allowing controlled SMTP relaying in Sendmail 8.9, (2 pages), http://web.archive.org/web/20000510213022/www.sendmail.org/tips/relaying.html.

Anti-Spam Configuration Control, (5 pages), http://web.archive.org/web/20000520064211/www.sendmail.org/m4/anti-spam.html.

Anti-Spam Provisions in Sendmail 8.8, (4 pages), http://web.archive.org/web/20000510040556/www.sendmail.org/antispam.html.

Mark Durham, Spam Control in 8.10, (3 pages), http://web.archive.org/web/20000618042433/sendmail.net/?feed=interview810-5.

Paul Boutin, RFC 2476: Message Submission Agent, (3 pages), http://web.archive.org/web/200010270602105/sendmail.net/?feed=rfc2476.

Paul Boutin, RFC 2554: SMTP Authentication, (4 pages), http://web.archive.org/web/20001016141928/sendmail.net/?feed=rfc2554.

(56) References Cited

OTHER PUBLICATIONS

Relaying Denied/Allowed (in sendmail 8.8/8.9), Last Update Feb. 11, 2000, (2 pages), http://web.archive.org/web/20000418000700/www.sendmail.org/~ca/email/relayingdenied . . . .

rfc2222, J. Myers, Simple Authentication and Security Layer (SASL), (16 pages), Oct. 1997, The Internet Society (1997), http://web.archive.org/web/20001027153713/www.cis.ohio-state.edu/htbin/rfc/rfc2222.ht . . . ,.

rfc2554, J. Myers, SMTP Service Extension for Authentication, (11 pages), Mar. 1999, The Internet Society (1999), http://web.archive.org/web/20001018181229/www.cis.ohio-state.edu/htbin/rfc/rfc2554.ht . . . ,.

Using SMTP AUTH in Sendmail 8.10, (2 pages), Mar. 27, 2000, http://web.archive.org/web/20001016174022/sendmail.net/?feed=usingsmthpauth.

Godfrey, J., "Instant Spam: It's Tough to Swallow," Home Office Computing, [online] vol. 16, No. 11, p. 24 [retrieved on Dec. 29, 2004]. Retrieved from <URL: http://proquest.umi.com/pdqweb?index=21&sid=2&srchmode=1&vinst=PROD&fmt=4&.

Melen et al., International Publication No. WO99/03238, Jan. 21, 1999.

USPTO Non-Final Office Action issued in U.S. Appl. No. 10/698,933, mailed Jun. 10, 2009, 16 pages.

USPTO Non-Final Office Action issued in U.S. Appl. No. 12/775,783, mailed Dec. 27, 2010, 23 pages.

\* cited by examiner

Fig. 8 and drawings, and from the claims.
SECURING AN ACCESSIBLE COMPUTER SYSTEM

CROSS REFERENCE TO RELATED APPLICATIONS

This application is a continuation of U.S. patent application Ser. No. 09/666,140, filed Sep. 20, 2000, which claims priority from U.S. Provisional Application 60/227,309, filed Aug. 24, 2000, each of the prior applications is incorporated by reference in its entirety for all purposes.

TECHNICAL FIELD

This invention relates to securing an accessible computer system. More particularly, this invention relates to detecting and preventing denial of service attacks on a computer system.

BACKGROUND

Accessible computer systems have proven susceptible to various attacks by computer hackers. In a type of computer attack known as a denial of service attack, a hacker attempts to deny service to legitimate users of online computer services. For instance, a hacker may send a high number of illegitimate access requests to an accessible computer system of an online computer service, causing the computer system to dedicate its resources to handling the illegitimate access requests rather than handling legitimate access requests from legitimate users. In this manner, legitimate users may be denied access to the online computer service because of the influx of illegitimate access requests sent by the hacker. This type of attack is commonly known as a synchronize (SYN) flood.

Another type of a computer attack occurs when a hacker attempts to gain unauthorized access to an online computer service. In this type of attack, the hacker uses a client to attempt to establish an unauthorized connection with the online computer service. Using a known logon identification, the hacker attempts to crack the password associated with the known logon identification by using a computer program that associates several passwords with the logon identification in rapid succession, repeatedly attempting to establish a connection to the computer service using the known logon identification and one of the associated passwords. This type of attack may tax processing resources to effectively deny legitimate users access to the online computer service.

When subject to such attacks, accessible computer systems may be forced to cease operation.

SUMMARY

In one general aspect, securing an accessible computer system includes monitoring a computer system for connection transactions between at least one access requestor and at least one access provider and denying access by the access requestor to the access provider when a number of connection transactions initiated by the access requestor exceeds a configurable threshold number during a first configurable period of time.

Embodiments may include one or more of the following features. For example, the monitoring may include detecting connection transactions initiated by the access requestor. The monitoring also may include counting the number of connection transactions initiated by the access requestor during the first configurable period of time, and comparing the number of connection transactions initiated by the access requestor during the first configurable period of time to the configurable threshold number.

The monitoring may include detecting connection transactions between at least one Internet protocol address and the access provider. The monitoring also may include counting the number of connection transactions initiated by the Internet protocol address during the first configurable period of time, and comparing the number of connection transactions initiated by the Internet protocol address during the first configurable period of time to the configurable threshold number.

Where the access requestor is a client and the access provider is a host, the monitoring may include detecting connection transactions between at least one client and at least one host. Where the access requestor is a client and the access provider is a host, the monitoring also may include detecting connection transactions between the access requestor and a group of access providers. The connection transactions may include connections made using TCP. Detecting connection transactions may include identifying the Internet protocol address through the use of a header attached to a message representing the connection transaction being detected.

The denying of access may include denying access to the access provider by the access requestor for a second configurable period of time. The denying of access also may include denying access to the access provider by the access requestor for a second configurable period of time after detecting a most recent connection transaction initiated by the access requestor. The denying of access may further include resetting the second configurable period of time after detecting a new connection transaction initiated by the access requestor during the second configurable period of time.

The general and specific aspects may be implemented using a system or method or combination of system and method.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
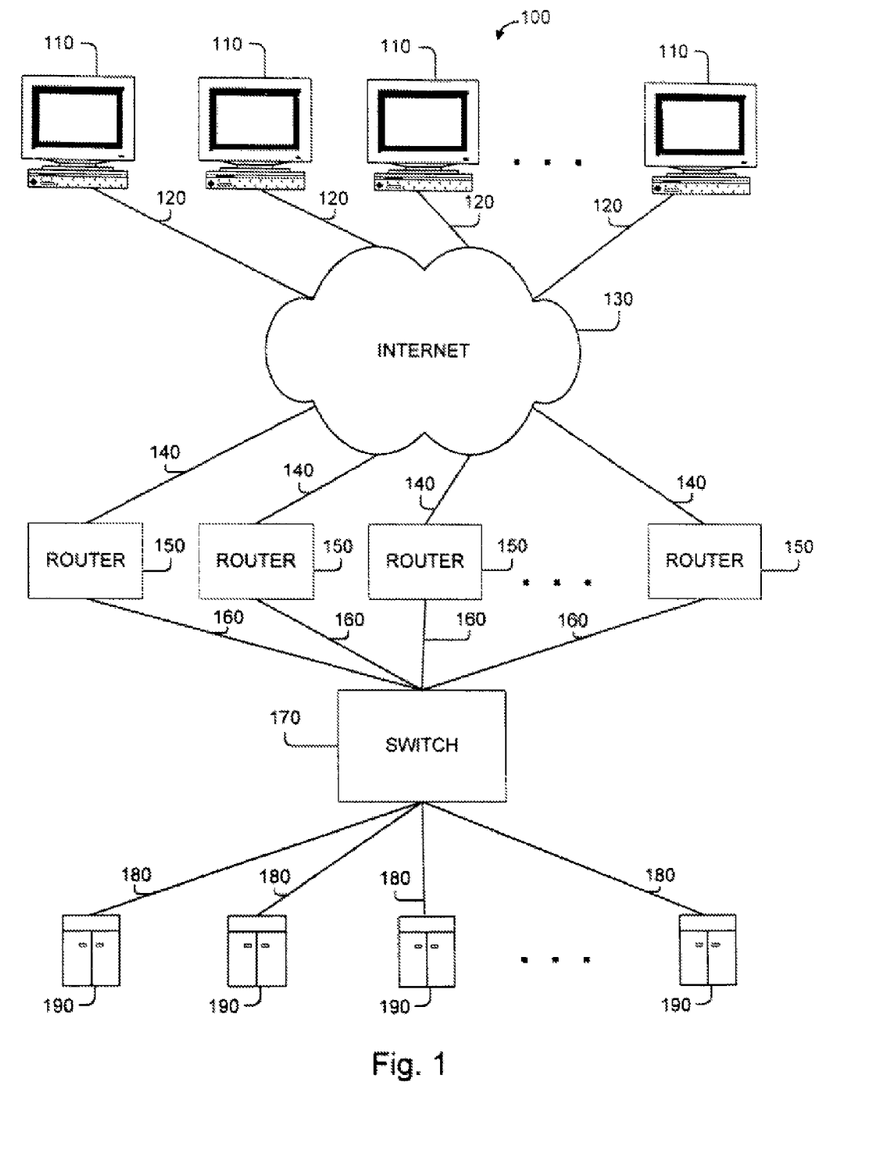
FIG. 1 is a block diagram that illustrates a physical level of an accessible computer system.

FIG. 1 is a block diagram that illustrates the physical level of an accessible computer system 100. FIG. 1 shows multiple access requestors 110, the Internet 130, multiple routers 150, switch 170, multiple access providers 190, and multiple communication links 120, 140, 160, and 180.

An access requestor 110 may include a client, and may be embodied in a general-purpose computer (e.g., a personal computer), a special-purpose computer, a workstation, a server, a personal digital assistant, an electronic organizer, a mobile phone, a pager, a device, a component, or other physical or virtual equipment or some combination thereof, any of which may be programmed or configured to respond to and execute instructions in a defined manner. Access requestors 110 are connected to the Internet 130 by communication links 120.

The Internet 130 is an example of a delivery network that may be used to enable communications to/from access requestors 110. Other examples of a delivery network may include the World Wide Web, wide area networks (WANs), local area networks (LANs), analog or digital wired and wireless telephone networks (e.g. Public Switched Telephone Network (PSTN), Integrated Services Digital Network (ISDN), and Digital Subscriber Lines (xDSL)), radio, television, cable, satellite, and/or any other delivery mechanism for carrying data. The Internet 130 is generally connected to one or more routers 150 by communication links 140.

Each router 150 generally includes a computer processor, computer software, a hardware device, other physical or virtual equipment or some combination of these elements that is capable of receiving, processing and transmitting information. In general, each router 150 routes communications between one or more access requestors 110 and one or more access providers 190. Communications received from an access provider 190 are generally routed to an access requestor 110 through the Internet 130. Communications received from an access requestor 110 are generally routed to an access provider 190 through a switch 170. More specifically, each router 150 receives a data packet and/or data request from access requestor 110 and routes the data packet and/or data request to one or more of the access providers 190 based on predefined criteria or algorithms. The routers 150 are connected to one or more switches 170 by communication links 160.

Switch 170 generally includes a hardware component and a software component. It is capable of receiving a unit of data and of transmitting the received data to one or more access providers 190 or routers 150 based on predefined criteria or algorithms. Switch 170 may perform load balancing algorithms such as hashing techniques to avoid overwhelming any particular router 150 or access provider 190. Switch 170 also may perform the functions of the router 150 as a separate or integrated component or device. Additionally or alternatively, switch 170 may include one or more processors and one or more storage and memory devices, such as internal memory. The switch 170 is connected to multiple access providers 190 by communication links 180.

An access provider 190 may be any software or hardware capable of providing access by an access requestor 110 to desired information or services. For instance, an access provider 190 may include a host, and it may be embodied in a general-purpose computer (e.g., a personal computer) or a special-purpose computer capable of communicating with one or more access requestors 110 by responding to and executing instructions in a defined manner. Other examples of an access provider 190 include a special-purpose computer, a work station, a server, a device, a component, other physical or virtual equipment or some combination of these elements that is capable of responding to and executing instructions as described.

Communication links 120, 140, 160 and 180 may include, for example, a wired, wireless, cable or satellite communication pathway.

Figure 2:
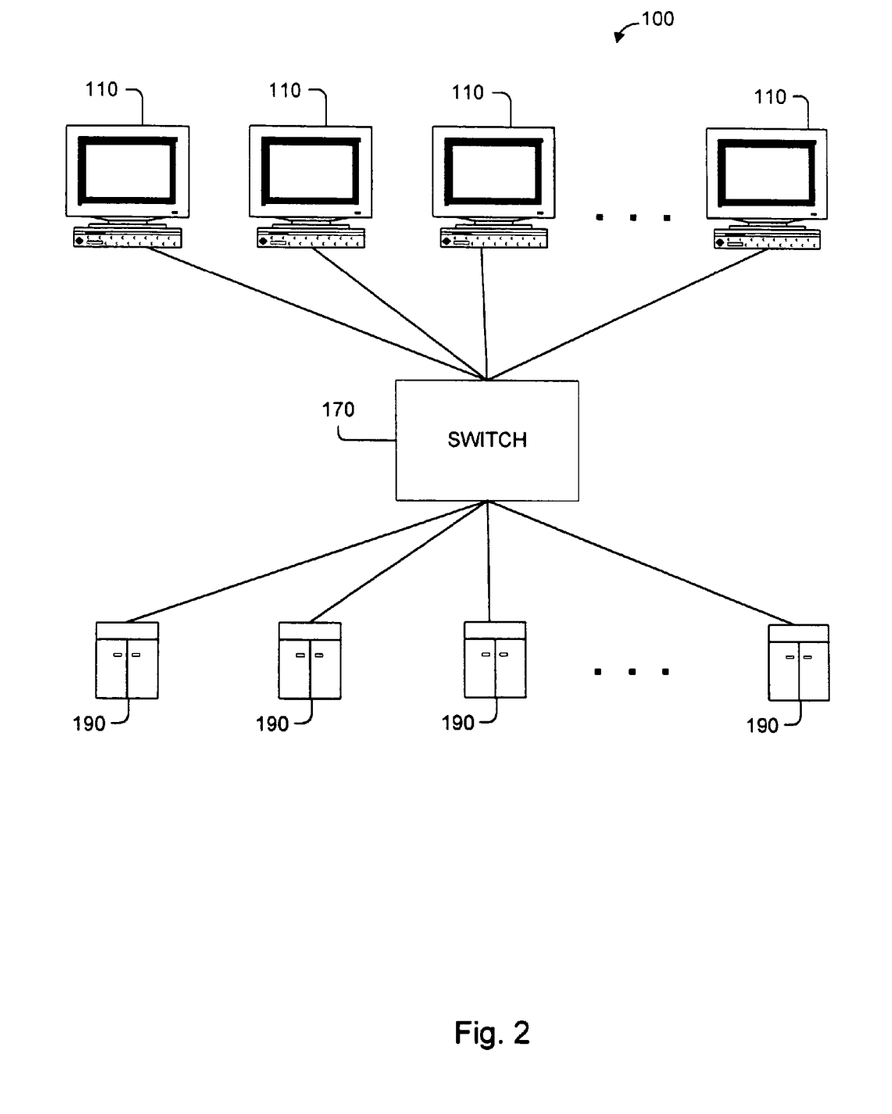
FIG. 2 is a block diagram that illustrates a logical level of the accessible computer system of FIG. 1.

FIG. 2 is a block diagram that illustrates a logical level of the system 100 illustrated in FIG. 1. FIG. 2 shows multiple access requestors 110, switch 170, and multiple access providers 190. In this figure, switch 170 may be representative of one or more of Internet 130, router 150 and switch 170, or some combination there between such as that described in FIG. 1.

An access requestor 110 is generally used to establish a physical or non-physical electronic connection with an access provider 190. Connections may be established on various levels using various protocols. For instance, a connection may be established on Level III (e.g., a packet based level), on Level IV (e.g., a protocol data unit based level with flow control and error correction) or on some other level using an appropriate protocol capable of establishing a connection between an access requestor 110 and an access provider 190. More specifically, examples of protocols include Transmission Control Protocol (TCP), Internet Protocol (IP), TCP/IP, User Datagram Protocol (UDP), and UDP/IP.

Access protocols are observed to establish a connection. Under an exemplary Level IV protocol, an access requestor 110 sends an access request through switch 170. The request is routed to one of the access providers 190, which responds to the access request by sending an acknowledgement that is routed back to the access requestor 110 through switch 170. When the access requestor 110 receives the acknowledgement sent by the access provider 190, the access requestor 110 generates an acknowledgement that is sent back to the access provider 190 through switch 170. The completion of this transaction establishes a connection between the access requestor 110 and the access provider 190.

For purposes of this detailed description, the term connection transaction is used to describe one or more of sending, receiving, or exchanging the units of data necessary to use a protocol (e.g., TCP, IP, UDP, TCP/IP, and UDP/IP) to establish a communications link (e.g., wired, wireless, cable, and satellite) between the access requestor 110 and access provider 190. One example of a connection transaction results in a TCP connection between the access requestor 110 and the access provider 190, where procedures to establish a connection transaction use the synchronize (SYN) control flag and involve an exchange of three messages. In this example, an access requestor 110 sends an access request (SYN REQ) to an access provider 190 through switch 170. The access provider 190 responds to the access requestor 110 through switch 170 with an acknowledgement (SYN ACK). Then, the access requestor 110 sends an acknowledgement (ACK) to access provider 190 via switch 170. Other connection transactions between access requestor 110 and access provider 190 through switch 170 are also possible and can result in different types of connections (e.g., IP, TCP/IP, UDP, and UDP/IP).

Figure 3:
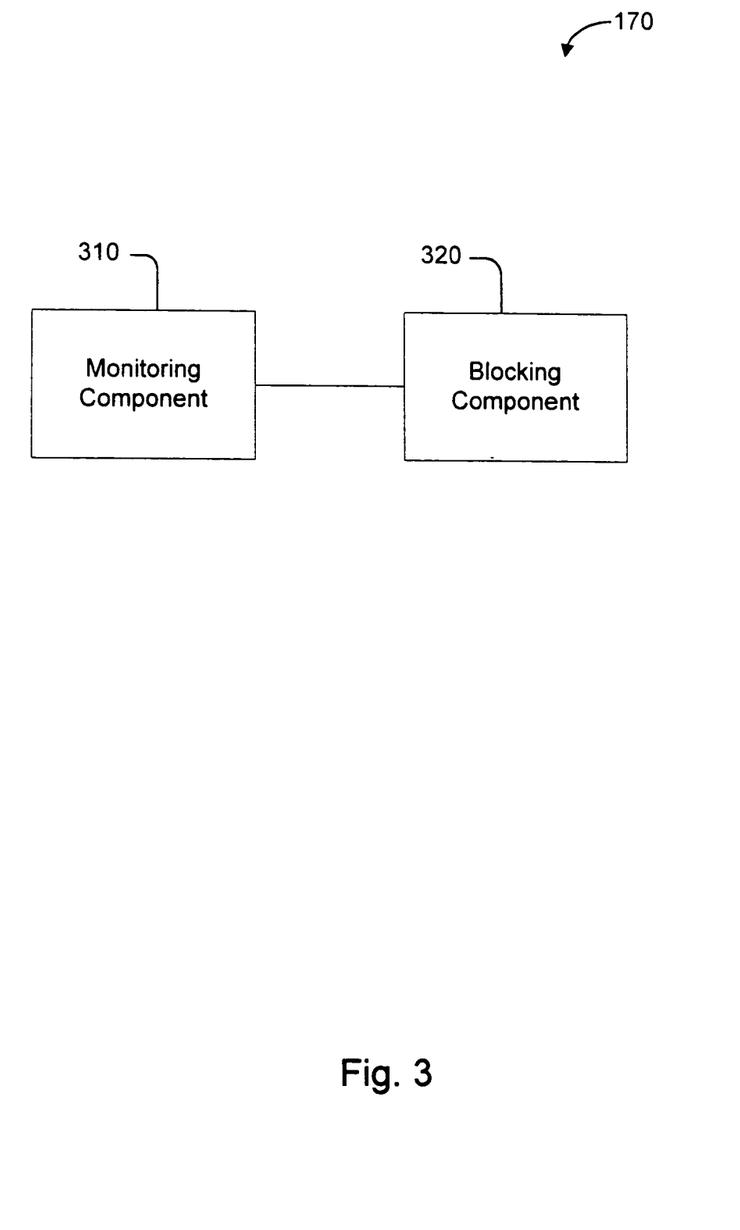
FIG. 3 is a block diagram that illustrates components included in a switch, such as those shown by FIGS. 1 and 2.

FIG. 3 is a block diagram that illustrates logical components of switch 170. As shown, the switch 170 includes the components necessary to detect and prevent a hacker attack on access providers 190. In particular, switch 170 includes a monitoring component 310 and a blocking component 320, which generally include one or more components embedded in software modules within a computing device, but may be embodied in physical devices connected to one another or may be embedded in some combination of software modules and physical devices. In other implementations, the components illustrated in FIG. 3 may be resident on an access provider 190.

The monitoring component 310 is structured and arranged to monitor the computer system 100 for connection transactions between the access requestor 110 and the access provider 190. The blocking component 320 is structured and arranged to deny access by access requestors 110 at one or more particular IP addresses to access providers 190 for a configurable period of time. Thus, attacks launched by any particular IP address may be prevented from reaching access provider 190. In other implementations, the blocking component 320 may be used to deny access by access requestors 110 at one or more particular IP addresses to access providers 190 for a period of time after a most recent connection transaction has been initiated by the access requestor 110 from that IP address. Thus, the period of time that the access requestor 110 from any particular IP address is denied access does not begin decrementing until after that access requestor 110 from that IP address stops attempting to establish a connection with the access providers 190. To this end, the blocking component 320 may be programmed not to completely deny access by the access requestor 110 at a particular IP address, but instead to allow the monitoring component 310 to continue to monitor the connection transactions initiated between that access requestor 110 at that particular IP address and the access providers 190.

Figure 4:
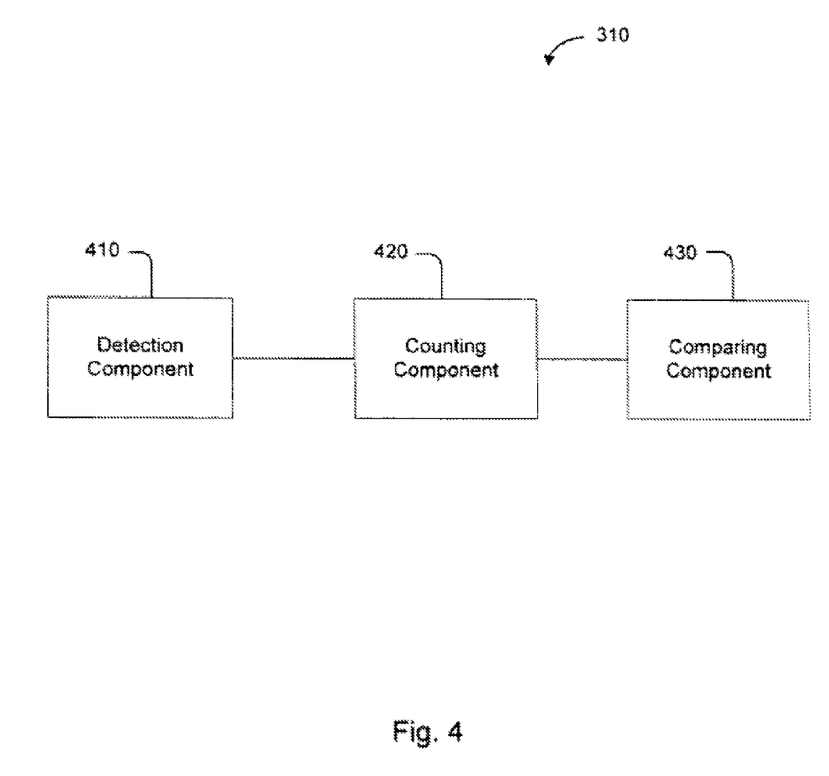
FIG. 4 is a block diagram that illustrates components included in a monitoring component of the switch of FIG. 3.

Referring to FIG. 4, the monitoring component 310 may include a detection component 410, a counting component 420, and a comparing component 430. The detection component 410 is structured and arranged to detect at least the initiation of connection transactions between the access requestor 110 and the access provider 190. For example, where the access requestor 110 includes one or more clients and the access provider 190 includes one or more hosts, the detection component 410 is capable of detecting connection transactions between at least one client and at least one host. The detection component 410 is generally programmable and capable of recognizing when a connection transaction is initiated by an access requestor 110. For example, detection component 410 may be programmed to recognize the initiation of a connection transaction used to establish a TCP connection between an access requestor 110 and an access provider 190. In this example, detection component 410 may be programmed to recognize the exchange of one or more messages (e.g., SYN REQ, SYN ACK, ACK) communicated between the access requestor 110 and the access provider 190 as indicative of the initiation or completion of a connection transaction. Additionally or alternatively, detection component 410 may be programmed to recognize connection transactions based on other criteria, or other connection transaction types altogether.

The detection component 410 generally includes an identifying component that is structured and arranged to identify the IP address through the use of a header attached to the IP address. For example, during a first connection transaction, access requestor 110 may be routed to a first access provider 190 such that a connection is established with the first access provider 190. During a subsequent second connection transaction, the same access requestor 110 may be routed to a second access provider 190 that is different from the first access provider 190, such that a connection is established with the second access provider 190. Thus, the number of connection transactions detected by detection component 410 involving a single access requestor 110 may be cumulative with respect to more than one access provider 190. More particularly, where access requestor 110 includes a client and access provider 190 includes a host, the detection component 410 is capable of detecting connection transactions between the access requestor 110 and multiple access providers 190. The detection component 410 is generally connected to the counting component 420.

The counting component 420 is generally structured and arranged to count the number of connection transactions initiated by the access requestor 110 during a configurable period of time. Counting component 420 counts and records the number of connection transactions that were detected by detection component 410. The configurable period of time may be programmed to be any length of time. The counting component 420 may be programmed, for example, to count all of the connection transactions between the access requestors 110 and the access providers 190. Counting component 420 includes a processor and an internal memory for counting and logging the number of connection transactions.

In one implementation, the counting component 420 counts the number of connection transactions initiated or established between a particular access requestor 110 and a single access provider 190. In another implementation, the detection component 410 detects connection transactions initiated or established between one Internet protocol (IP) address and any access provider 190. The counting component 420 counts the number of connection transaction initiated by that IP address during a set period of time.

Counting component 420 is capable of counting the number of connection transactions initiated from an access requestor 110 at a single IP address, irrespective of the access provider 190 with which the access requestor 110 seeks to establish a connection. For example, during a first connection transaction, the access requestor 110 from a single IP address may initiate a connection with a first access provider 190, while during a subsequent connection transaction, the access requestor 110 from the same IP address may initiate a connection with a different access provider 190. Counting component 420 may be configured to count and log each of these connection transactions in association with the IP address.

The comparing component 430 then compares the total number of connection transactions made by the access requestor 110 from the IP address during a period of time to a threshold number of connection transactions. If the threshold number is exceeded, then the blocking component 320 denies access by the access requestor 110 from that IP address to access providers 190.

The comparing component 430 is structured and arranged to compare the number of connection transactions that involve the access requestor 110 during a configurable period of time against a threshold number of connection transactions, which is also configurable. In one implementation, when the threshold number of connection transactions between the same access requestor 110 and any access provider 190 is exceeded during the configurable period of time, the blocking component 320 denies the access requestor 110 access to one or more access providers 190.

Figure 5:
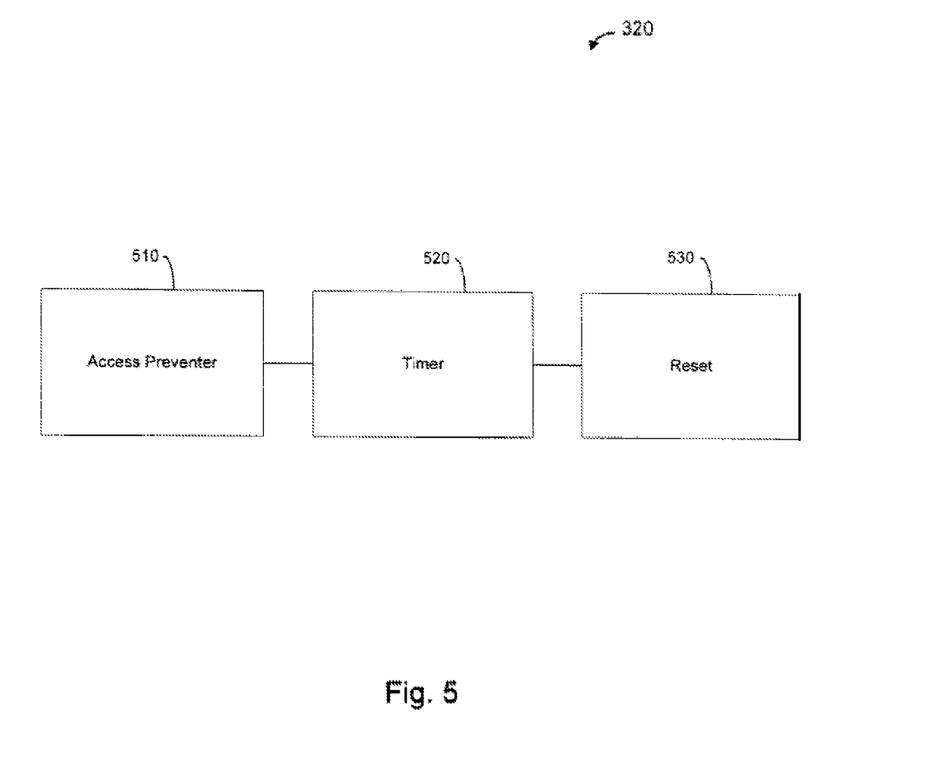
FIG. 5 is a block diagram that illustrates components included in a blocking component of the switch of FIG. 3.

Referring to FIG. 5, the blocking component 320 includes an access preventer 510, a timer 520, and a reset 530. Access preventer 510 is structured and arranged to deny access by the access requestor 110 to the access providers 190 for a configurable period of time. Access preventer 510 is connected to timer 520.

Timer 520 is structured and arranged to measure the configurable period of time during which access preventer 510 denies access by the access requestor 110. Thus, when the comparing component 430 determines that the configurable threshold number has been exceeded by the access requestor 110, the access preventer 510 denies access by the access requestor 110 and the timer 520 measures the configurable period of time during which access is denied. Timer 520 is connected to reset 530.

Reset 530 may be structured and arranged to reset the configurable period of time measured by timer 520 for which an access requestor 110 is denied access if the monitoring component 310 detects a new connection transaction initiated by such an access requestor 110. For example, if an access requestor 110 that is timed out for exceeding the threshold number of connection transactions initiates a new connection transaction during the time out period, reset 530 will start a new time out period during which the access requestor 110 will continue to be denied access.

Figure 6:
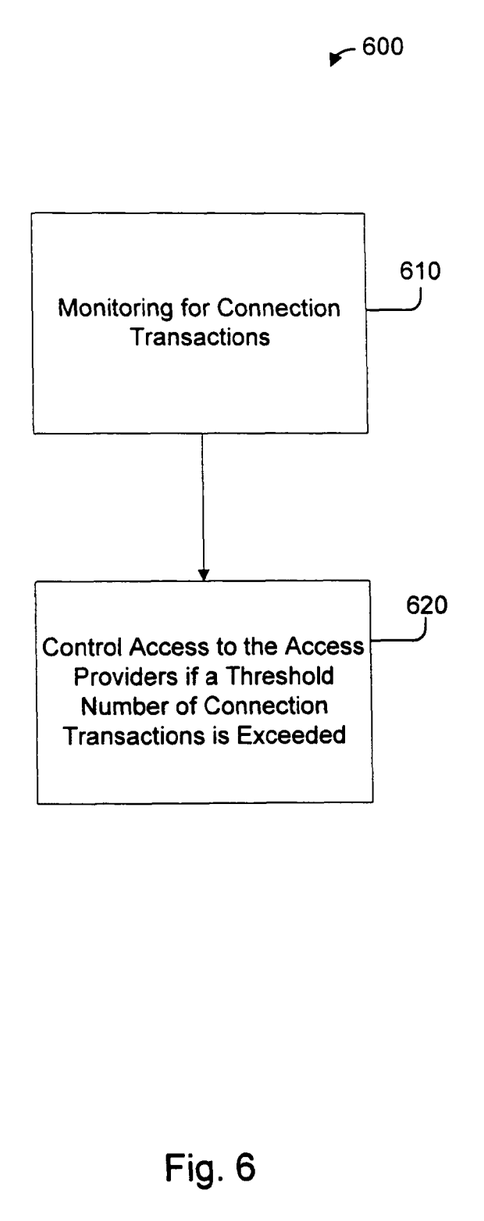
FIG. 6 is a flowchart of a process for securing an accessible computer system, which may be performed by the systems shown by FIGS. 1-5.

Referring to FIG. 6, a process 600 is described for securing an accessible computer system, which process 600 may be performed by the systems described above with respect to FIGS. 1-5. For instance, process 600 may be performed by a switch 170, by an access provider 190, or by a combination of the two. The method also may be performed by any other hardware device or software device capable of being programmed to receive, process, and send instructions in the manner described. The process 600 generally includes monitoring a computer system for connection transactions (step 610) and controlling access to access providers 190 if a threshold number of connection transactions is exceeded over a configurable period of time (step 620). Controlling access may include denying access to the access providers 190 for a configurable period of time. The configurable period of time may be set for any duration. For example, the access requestor 110 at a particular IP address may be denied access for a period of time that does not begin until after the most recent attempt by the access requestor 110 to establish a connection.

Figure 7:
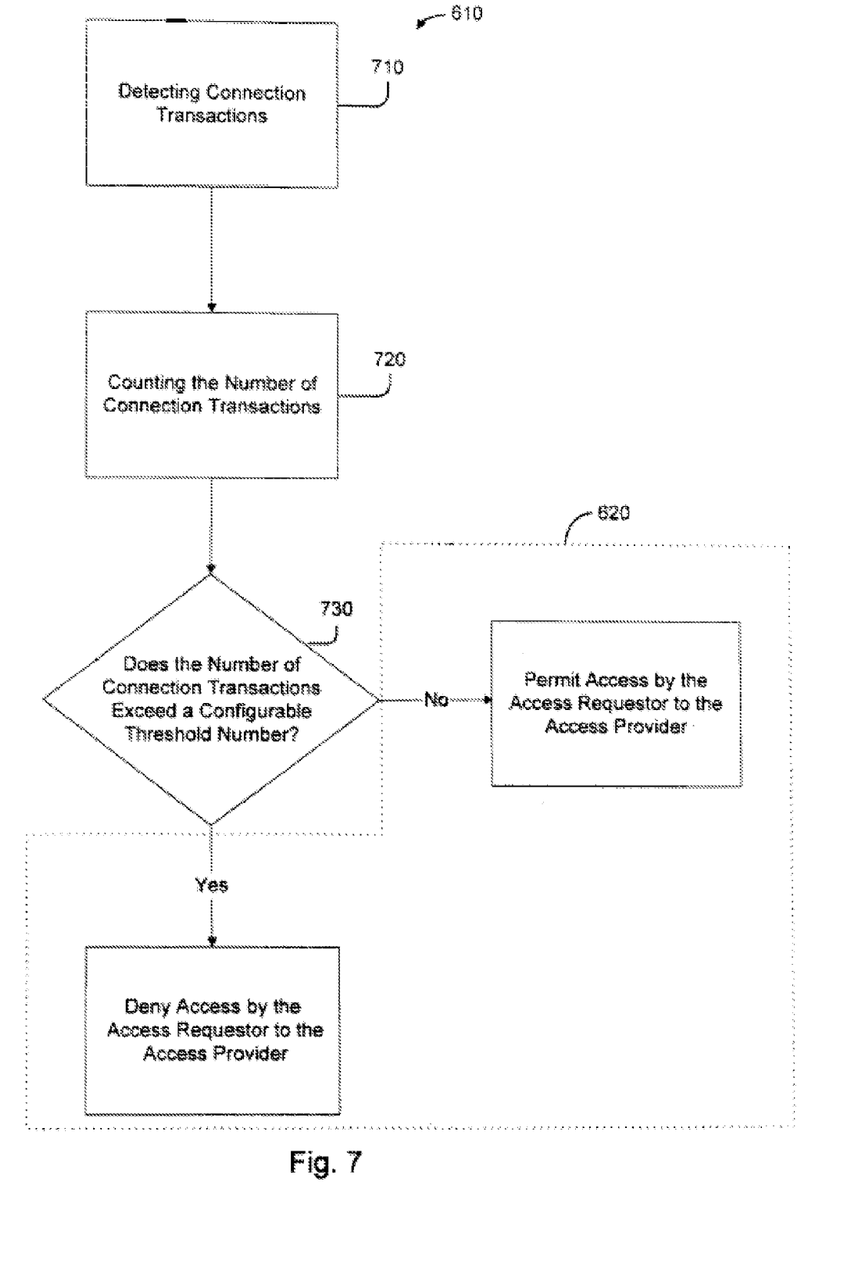
FIG. 7 is a flowchart of a process for monitoring the computer system for connection transactions as part of the process of FIG. 6.

Referring to FIG. 7, monitoring the computer system for connection transactions (step 610 of FIG. 6) may include detecting connection transactions (step 710), counting the number of connection transactions (step 720), and comparing the number of connection transactions initiated by an access requestor during a configurable period of time to a configurable threshold number (step 730).

Detecting connection transactions (step 710) may include detecting one or more components of the connection transactions from each of one or more IP addresses. For example, detecting may include recognizing one or more components of the connection transactions used to establish a TCP connection between an access requestor 110 and an access provider 190. In this example, detecting typically includes recognizing the exchange of messages (e.g., SYN REQ, SYN ACK, ACK) exchanged between the access requestor 110 and the access provider 190 during a connection transaction. Additionally or alternatively, detecting may include recognizing other connection transactions or their components.

In another example, during a first connection transaction, an access requestor 110 may be routed to a first access provider 190 such that a connection is established with the first access provider 190, and during a subsequent second connection transaction, the same access requestor 110 may be routed to a second access provider 190 different from the first access provider 190 such that connection is established with the second access provider 190. Thus, the number of connection transactions detected in the detecting step 710 may be between a single access requestor 110 and any of several access providers 190, with the detected transactions being cumulative with respect to more than one access provider 190. For example, where the access requestor 110 includes a client and the access provider 190 includes a host, the detecting step 710 may include detecting connection transactions between the access requestor 110 and multiple access providers 190. In another example, the detecting step 710 may include detecting connection transactions between at least one client and at least one host.

The detecting step 710 is generally followed by a counting step 720, as shown, which may count and log each connection transaction or transaction involving an access requestor 110. The counting 720 generally includes counting the number of times a connection transaction or transaction component between an IP address and a host has been detected during a configurable period of time. In one implementation, the counting step 720 is capable of counting the number of connection transactions initiated or established between a particular access requestor 110 and a single access provider 190, and the number of connection transactions initiated or established between one Internet protocol (IP) address and several of the access providers 190. In general, the connection transactions initiated by the access requestor 110 are counted during a set period of time.

The comparing step 730 includes comparing a configurable threshold number to the number of connection transactions that have occurred between an access requestor 110 at a particular IP address and one or more access providers 190 during a configurable period of time. If the number of connection transactions or detected and counted transaction components are determined to exceed the configurable threshold number, access to the access providers 190 is denied (step 620 of FIG. 6). Otherwise, access is permitted.

In one implementation, detecting the connection transactions (step 710) includes identifying the IP address through the use of a header attached to the IP address. The use of the header to identify the IP address allows a determination of which particular IP address is being used to attack the access providers 190 through a denial of service attack.

Figure 8:
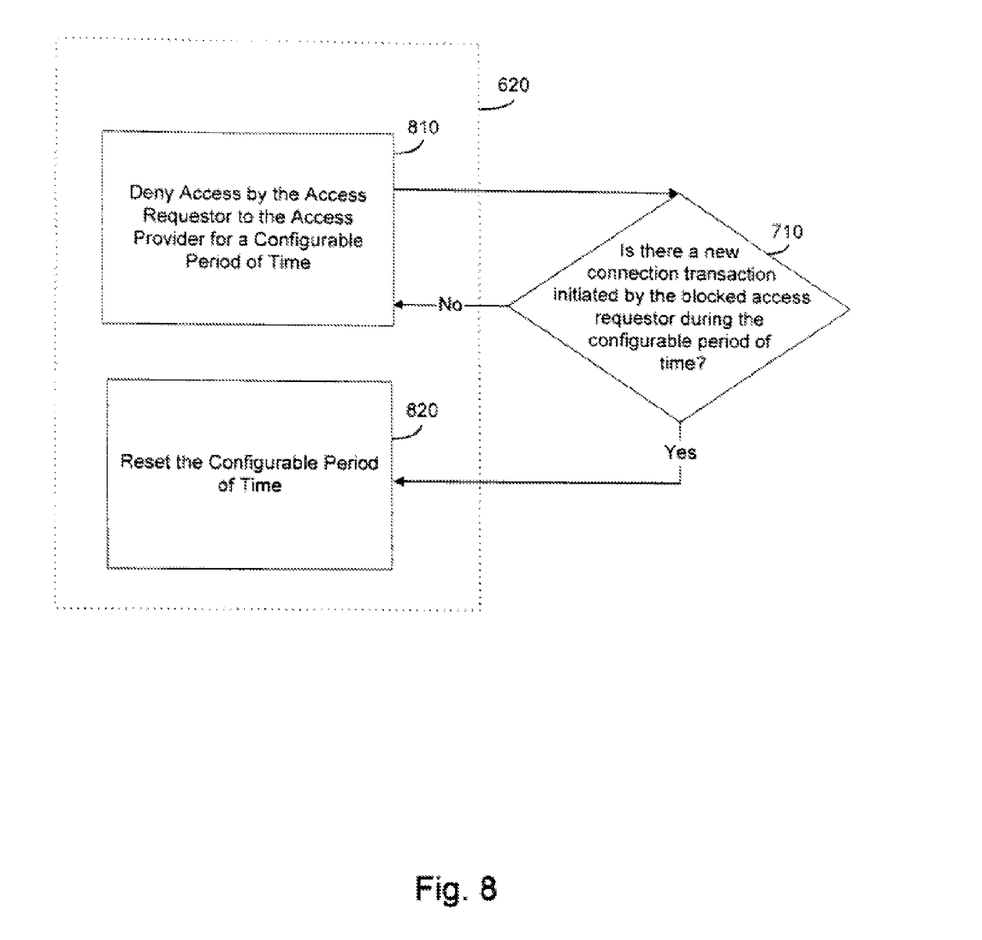
FIG. 8 is a flowchart of a process for controlling access to access providers as part of the process of FIG. 7.

Referring to FIG. 8, controlling access to access providers 190 (step 620 of FIG. 6) generally includes denying access by the access requestor 110 to access providers 190 for a configurable period of time (step 810), monitoring the computer system for connection transactions initiated by a blocked access requestor 110 (step 710 of FIG. 7), and resetting or changing the configurable period of time if a new connection transaction is initiated by a blocked access requestor 110 (step 820), then continuing to deny access by the blocked access requestor 110 to the access provider 190 for the reset or changed period of time (step 810).

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components.

In addition, the systems, methods, and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM disks). Any of the foregoing may be supplemented by, or incorporated in, specially-designed ASICs (application-specific integrated circuits).

Accordingly, other embodiments are within the scope of the following claims.

What is claimed is:

1. A method for securing an accessible computer system, the method comprising:
   counting, at a switch that performs load balancing for access provider systems, a cumulative number of access requests initiated by an access requestor to all of the access provider systems during a first period of time;
   determining, by the switch, that the cumulative number of access requests exceeds a threshold number, even though a number of access requests to each of the access provider systems alone is less than the threshold number;
   denying, at the switch, access by the access requestor to the access provider systems in response to determining that the cumulative number of access requests exceeds the threshold number; and
   restarting a time out period during which the access requestor is denied access based on detecting, at the switch, receipt of another access request from the access requestor before the time out period expires.

2. The method of claim 1, wherein the determining further includes comparing, using the switch, the cumulative number of access requests to the threshold number.

3. The method of claim 1, wherein the denying of access includes denying access by the access requestor to the access provider systems for a second period of time.

4. The method of claim 1, wherein the denying of access includes denying access by the access requestor to the access provider systems for a second period of time after detecting a most recent access request received from the access requestor at the switch.

5. The method of claim 1, wherein the determining further includes determining, by the switch, whether a total number of access requests initiated to all of the access provider systems by the access requestor during the first period of time exceeds the threshold number.

6. A method comprising:
   monitoring, at a switch connected to access provider systems, for access requests by an access requestor to the access provider systems;
   based on the monitoring, determining, by the switch, whether a cumulative number of access requests, received from the access requestor during a first period of time and handled by more than one of the access provider systems, exceeds a threshold number;
   denying, at the switch and for a second period of time, access by the access requestor to the access provider systems in response to a determination that the cumulative number of access requests exceeds the threshold number; and
   restarting the second period of time during which the access requestor is denied access in response to detecting, at the switch, receipt of another access request from the access requestor before the second period of time expires.

7. The method of claim 6, wherein the monitoring further includes counting, using the switch, a cumulative number of access requests for all of the access provider systems connected to the switch initiated by the access requestor during the first period of time.

8. The method of claim 7, wherein the determining further includes comparing, using the switch, the cumulative number of access requests for all of the access provider systems to the threshold number.

9. The method of claim 8, wherein the denying of access further includes denying, using the switch, access by the access requestor to all of the access provider systems connected to the switch when the comparison indicates that the cumulative number of access requests for all of the access provider systems exceeds the threshold number.

10. A switch comprising:
    a processor; and
    a memory encoded with machine readable instructions that, when executed by the processor, operate to cause the processor to perform operations comprising:
      performing load balancing for access provider systems;
      counting a cumulative number of access requests initiated by an access requestor to all of the access provider systems during a first period of time;
      determining that the cumulative number of access requests exceeds a threshold number, even though a number of access requests to each of the access provider systems alone is less than the threshold number;
      denying, at the switch, access by the access requestor to the access provider systems in response to determining that the cumulative number of access requests exceeds the threshold number; and
      restarting a time out period during which the access requestor is denied access based on detecting receipt of another access request from the access requestor before the time out period expires.

11. The switch of claim 10, wherein the determining further includes comparing, using the switch, the cumulative number of access requests to the threshold number.

12. The switch of claim 10, wherein the denying of access includes denying access by the access requestor to the access provider systems for a second period of time.

13. The switch of claim 10, wherein the denying of access includes denying access by the access requestor to the access provider systems for a second period of time after detecting a most recent access request received from the access requestor at the switch.

14. The switch of claim 10, wherein the determining further includes determining whether a total number of access requests initiated to all of the access provider systems by the access requestor during the first period of time exceeds the threshold number.

15. A switch comprising:
a processor; and
a memory encoded with machine readable instructions that, when executed by the processor, operate to cause the processor to perform operations comprising:
  monitoring for access requests by an access requestor to access provider systems connected to the switch;
  based on the monitoring, determining whether a cumulative number of access requests, received from the access requestor during a first period of time and handled by more than one of the access provider systems, exceeds a threshold number;
  denying, at the switch and for a second period of time, access by the access requestor to the access provider systems in response to a determination that the cumulative number of access requests exceeds the threshold number; and
  restarting the second period of time during which the access requestor is denied access in response to detecting, at the switch, receipt of another access request from the access requestor before the second period of time expires.

16. The switch of claim 15, wherein the monitoring further includes counting a cumulative number of access requests for all of the access provider systems connected to the switch initiated by the access requestor during the first period of time.

17. The switch of claim 16, wherein the determining further includes comparing the cumulative number of access requests for all of the access provider systems to the threshold number.

18. The switch of claim 17, wherein the denying of access further includes denying access by the access requestor to all of the access provider systems connected to the switch when the comparison indicates that the cumulative number of access requests for all of the access provider systems exceeds the threshold number.

* * * * *